(12) United States Patent
Fu et al.

(10) Patent No.: US 11,765,480 B2
(45) Date of Patent: Sep. 19, 2023

(54) PIXEL COLLECTION CIRCUIT, DYNAMIC VISION SENSOR, AND IMAGE CAPTURE DEVICE

(71) Applicant: Huawei Technologies Co., Ltd., Guangdong (CN)

(72) Inventors: Yifan Fu, Shenzhen (CN); Shan Gao, Dongguan (CN); Jiantong Zhou, Shenzhen (CN); Jing Xiao, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/582,358

(22) Filed: Jan. 24, 2022

(65) Prior Publication Data

US 2022/0150433 A1    May 12, 2022

Related U.S. Application Data

(63) Continuation of application No. PCT/CN2020/100454, filed on Jul. 6, 2020.

(30) Foreign Application Priority Data

Jul. 26, 2019    (CN) .......................... 201910684959.4

(51) Int. Cl.
*H04N 25/75*    (2023.01)
*H04N 25/50*    (2023.01)
*H04N 25/772*    (2023.01)

(52) U.S. Cl.
CPC ............. *H04N 25/75* (2023.01); *H04N 25/50* (2023.01); *H04N 25/772* (2023.01)

(58) Field of Classification Search
None
See application file for complete search history.

(56) References Cited

U.S. PATENT DOCUMENTS 9,986,211 B2    5/2018    Gousev et al.
2010/0182468 A1    7/2010    Posch et al.
(Continued)

FOREIGN PATENT DOCUMENTS

CN    102642068 A    8/2012
CN    104956654 A    9/2015
(Continued)

OTHER PUBLICATIONS

Xu Yu-chun et al, Designation of Visual Alarm Signals Test Device, Mar. 2014, with an English Abstract, total 3 pages.

*Primary Examiner* — Mark T Monk
(74) *Attorney, Agent, or Firm* — WOMBLE BOND DICKINSON (US) LLP

(57) ABSTRACT

This application provides a pixel collection circuit comprising an optical-to-electrical converter circuit configured to convert a collected optical signal into an analog signal; an analog-to-digital converter circuit configured to: receive the analog signal from the optical-to-electrical converter circuit; and perform analog-to-digital conversion on the analog signal to obtain a digital signal; a differential circuit configured to: receive the digital signal from the analog-to-digital converter circuit; and obtain a difference signal between a digital signal of a previous triggering moment and the digital signal of a current triggering moment; the previous triggering moment and the current triggering moment are determined by at least a digital clock signal; a comparison circuit configured to receive the difference signal from the differential circuit, and output a pulse signal. A digital component is used to implement the pixel collection circuit in the dynamic vision sensor, so as to reduce noise, reduce interference, and facilitate debugging.

16 Claims, 9 Drawing Sheets

(56) References Cited

U.S. PATENT DOCUMENTS

| | | | |
|---|---|---|---|
| 2010/0182470 A1* | 7/2010 | Sugawa | H04N 25/41 348/294 |
| 2015/0311913 A1 | 10/2015 | Pan et al. | |
| 2016/0093273 A1 | 3/2016 | Wang et al. | |
| 2016/0094787 A1 | 3/2016 | Govil et al. | |
| 2016/0227135 A1 | 8/2016 | Matolin et al. | |
| 2019/0011499 A1 | 1/2019 | Nicolaidis | |

FOREIGN PATENT DOCUMENTS

| | | |
|---|---|---|
| CN | 105706439 A | 6/2016 |
| CN | 106470322 A | 3/2017 |
| CN | 106716441 A | 5/2017 |
| CN | 106716443 A | 5/2017 |
| CN | 107736015 A | 2/2018 |
| CN | 108200364 A | 6/2018 |
| CN | 108833812 A | 11/2018 |
| EP | 3563564 B1 | 12/2021 |
| EP | 3967027 A1 | 3/2022 |
| WO | 2018122798 A1 | 7/2018 |
| WO | 2020229981 A1 | 11/2020 |

\* cited by examiner

PIXEL COLLECTION CIRCUIT, DYNAMIC VISION SENSOR, AND IMAGE CAPTURE DEVICE

CROSS-REFERENCE TO RELATED APPLICATIONS

This application is a continuation of International Application No. PCT/CN2020/100454, filed on Jul. 6, 2020, which claims priority to Chinese Patent Application No. 201910684959.4, filed on Jul. 26, 2019. The disclosures of the aforementioned applications are hereby incorporated by reference in their entireties.

TECHNICAL FIELD

This application relates to the field of moving image capture, and in particular, to a pixel collection circuit, a dynamic vision sensor, and an image capture device.

BACKGROUND

With development of science and technology, the field of moving image capture raises increasingly high requirements on quality of captured images. A common camera can capture about 25 to 30 frames per second, but is difficult to capture an object moving at a high speed. At present, there are mainly two moving image capture technologies: a "frame" based high-speed camera and an "event" based image capture camera (event based camera). The "frame" based high-speed camera can capture about 1000 frames per second, and can capture an object moving at a high speed, but needs to collect a large amount of data, resulting in high energy consumption and poor efficiency. In contrast, unlike the "frame" based high-speed camera, the "event" based high-speed camera is a research achievement of bionics, and can respond to a pulse generated from a pixel-level light change in a field of view that is caused by a motion. Image capture is performed only when an "event" occurs (for example, a light intensity in the field of view increases or decreases). If no "event" occurs, image capture is not performed. The "event" based high-speed camera has been widely used in the field of moving image capture due to its fast data collection, small collection amount, and low power consumption.

A dynamic vision sensor (DVS), also referred to as a brain-like camera DVS, is an image sensor in an "event" based image capture camera. A pixel collection circuit in the DVS mimics a retinal imaging theory, and includes an image receiver, a differential circuit, and a comparison and output circuit. The differential circuit plays an essential role in motion capture. However, because the pixel collection circuit is an analog circuit and processes analog signals, these analog signals are prone to be interfered with by noise, causing a change to information in the signals, image distortion, and even signal interruption in a severe case.

SUMMARY

This application provides a pixel collection circuit, a dynamic vision sensor, and an image capture device, so as to reduce noise, reduce interference, and facilitate debugging.

According to a first aspect, this application provides a pixel collection circuit. The pixel collection circuit may be disposed in an event based high-speed camera, for example, a high-speed camera in a device such as a mobile phone, a surveillance camera, or an event data recorder. The device may be configured in scenarios such as assisted driving, automated driving, smart home, and safe city. In this case, the pixel collection circuit may include an optical-to-electrical converter circuit, an analog-to-digital converter circuit, a differential circuit, and a comparison circuit. The optical-to-electrical converter circuit first converts a collected optical signal into an analog signal, and outputs the analog signal to the analog-to-digital converter circuit. Then, the analog-to-digital converter circuit receives the analog signal from the optical-to-electrical converter circuit, and the analog-to-digital converter circuit performs analog-to-digital conversion on the analog signal to obtain a digital signal, and outputs the digital signal to the differential circuit. Next, the differential circuit receives the digital signal from the analog-to-digital converter circuit, and the differential circuit obtains a difference signal between a digital signal of a previous triggering moment and the digital signal of a current triggering moment, and outputs the difference signal to the comparison circuit. Finally, the comparison circuit receives the difference signal from the differential circuit, and compares the difference signal with a preset threshold to output a pulse signal. The pulse signal herein is used to indicate whether an event occurs.

In this application, the previous triggering moment and the current triggering moment are determined by at least a digital clock signal. The event may be whether the optical signal collected by the optical-to-electrical converter circuit changes, that is, whether a light intensity in a field of view changes, for example, increases or decreases.

In this application, a pixel collection circuit in a DVS is implemented by using a digital component, so as to reduce noise introduced by instability of an analog signal in the DVS, and further reduce interference in the DVS. Further, a structure of the pixel collection circuit implemented by using the digital component is relatively simple and convenient for debugging.

According to the first aspect, the differential circuit includes a storage circuit and a subtraction circuit. An input end of the storage circuit is electrically connected to an output end of the analog-to-digital converter circuit, an output end of the storage circuit is electrically connected to a first input end of the subtraction circuit, a second input end of the subtraction circuit is electrically connected to the output end of the analog-to-digital converter circuit, and an output end of the subtraction circuit is electrically connected to an input end of the comparison circuit. The storage circuit and the subtraction circuit have different triggering moments. The storage circuit is configured to: buffer, at a triggering moment, the digital signal output by the analog-to-digital converter circuit, and output, to the subtraction circuit, the digital signal buffered at the current triggering moment; and output, to the subtraction circuit at a non-triggering moment, a digital signal buffered at a previous triggering moment. The subtraction circuit is configured to calculate the difference signal based on the digital signal output by the storage circuit and the digital signal output by the analog-to-digital converter circuit, and output the difference signal to the comparison circuit.

In this application, the digital signal output by the storage circuit may be the digital signal output by the analog-to-digital converter circuit at the current triggering moment, or may be the digital signal output by the analog-to-digital converter circuit at the previous triggering moment.

In one embodiment, the storage circuit is one of the following digital components: a memory, a latch, a trigger, or a register.

In one embodiment, the pixel collection circuit further includes a reset circuit, configured to generate a reset signal based on the pulse signal, and output the reset signal to the storage circuit.

In one embodiment, the reset signal is used to control a status of the storage circuit together with the digital clock signal. In one embodiment, the reset signal is used to control, together with a digital clock signal in an enabled state, the storage circuit to update a buffered digital signal.

In one embodiment, an input end of the reset circuit is electrically connected to an output end of the comparison circuit, and an output end of the reset circuit is electrically connected to a reset signal input end of the storage circuit. The reset circuit is configured to generate the reset signal when the pulse signal indicates that the event occurs, and output the reset signal to the storage circuit.

In one embodiment, the preset threshold includes a first threshold and a second threshold, and the first threshold is greater than the second threshold. The comparison circuit is configured to: when the difference signal is greater than or equal to the first threshold, output the pulse signal whose level is a first value; or when the difference signal is less than or equal to the second threshold, output the pulse signal whose level is a second value; or when the difference signal is less than the first threshold and greater than the second threshold, output the pulse signal whose level is a third value; or when the comparison circuit is not triggered, output the pulse signal whose level is a fourth value. When the pulse signal is the first value or the second value, it indicates that the event occurs; or when the pulse signal is the third value or the fourth value, it indicates that the event does not occur.

In one embodiment, the subtraction circuit includes an absolute value subtractor, configured to calculate an absolute value of the difference signal based on the digital signal of the previous triggering moment that is output by the storage circuit and the digital signal of the current triggering moment that is output by the analog-to-digital converter circuit, and output the absolute value of the difference signal to the comparison circuit. The comparison circuit is configured to: when the absolute value of the difference signal is greater than the preset threshold, output the pulse signal whose level is a fifth value; or when the absolute value of the difference signal is less than or equal to the preset threshold, output the pulse signal whose level is a sixth value. When the pulse signal is the fifth value, it indicates that the event occurs; or when the pulse signal is the sixth value, it indicates that the event does not occur.

In one embodiment, the pixel collection circuit further includes an accumulation circuit, configured to accumulate, at a non-triggering moment, the analog signal output from the optical-to-electrical converter circuit, and output an accumulated analog signal to the analog-to-digital converter circuit at a triggering moment; or further configured to accumulate, at a non-triggering moment, the digital signal output from the analog-to-digital converter circuit, and output an accumulated digital signal to the differential circuit at a triggering moment.

In one embodiment, the pixel collection circuit further includes a switch circuit. A first input end of the switch circuit is electrically connected to the output end of the analog-to-digital converter circuit, and a second input end of the switch circuit is electrically connected to the output end of the comparison circuit. The switch circuit is configured to receive the digital signal output by the analog-to-digital converter circuit and the pulse signal output by the comparison circuit; or when the pulse signal indicates that the event occurs, output the digital signal.

In one embodiment, the first input end of the switch circuit is electrically connected to an output end of the optical-to-electrical converter circuit, or the first input end of the switch circuit is electrically connected to an output end of the accumulation circuit, and the second input end of the switch circuit is electrically connected to the output end of the comparison circuit. The switch circuit is further configured to receive the analog signal output by the optical-to-electrical converter circuit and the pulse signal output by the comparison circuit, or when the pulse signal indicates that the event occurs, output the analog signal; or the switch circuit is further configured to receive the digitally accumulated analog signal output by the accumulation circuit and the pulse signal output by the comparison circuit, or when the pulse signal indicates that the event occurs, output the accumulated analog signal.

In one embodiment, the switch circuit is further configured to: when the pulse signal indicates that the event does not occur, keep outputting the digital signal of the previous triggering moment; or when the pulse signal indicates that the event does not occur, output no signal; or when the pulse signal indicates that the event does not occur, output a low-level signal.

In one embodiment, the accumulation circuit includes an analog buffer or a digital buffer. An input end of the analog buffer is electrically connected to the output end of the optical-to-electrical converter circuit, and an output end of the analog buffer is electrically connected to an input end of the analog-to-digital converter circuit. An input end of the digital buffer is electrically connected to the output end of the analog-to-digital converter circuit, and an output end of the digital buffer is electrically connected to an input end of the differential circuit.

According to a second aspect, this application provides a dynamic vision sensor, including a dynamic vision sensor array and a peripheral circuit. The dynamic vision sensor array includes a plurality of the pixel collection circuits according to any one of the first aspect and the possible implementations of the first aspect. The pixel collection circuit is configured to generate a pulse signal based on an optical signal, and output the pulse signal to the peripheral circuit. The peripheral circuit is configured to generate an address event representation based on the pulse signal.

According to a third aspect, this application provides an image capture device, including the dynamic vision sensor according to any one of the second aspect and the possible implementations of the second aspect, configured to generate the address event representation based on the optical signal; and a working circuit, configured to generate an image based on the address event representation.

It should be understood that, technical solutions in the second aspect and the third aspect of this application are consistent with technical solutions in the first aspect of this application. Beneficial effects achieved by the various aspects and corresponding feasible implementations are similar. Details are not described again.

BRIEF DESCRIPTION OF DRAWINGS

To describe technical solutions in embodiments of this application or in the background more clearly, the following describes the accompanying drawings for describing the embodiments of this application or the background.

DESCRIPTION OF EMBODIMENTS

Figure 1:
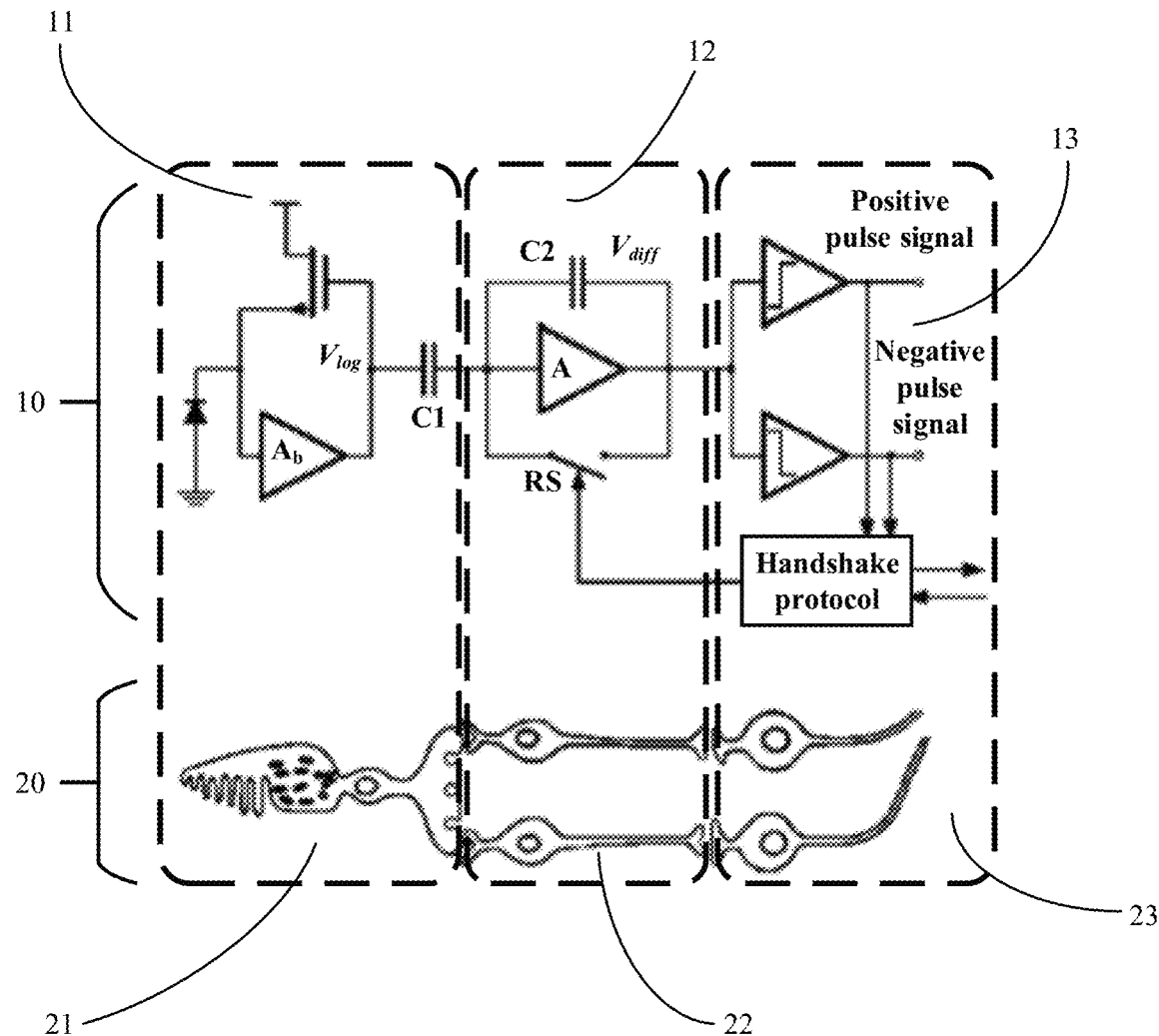
FIG. 1 is a schematic diagram of a structure of a pixel collection circuit designed by mimicking a retinal imaging theory according to an embodiment of this application.

The following describes the embodiments of this application with reference to the accompanying drawings in the embodiments of this application. In the following description, reference is made to the accompanying figures, which form part of this application, and which show, by way of illustration, specific aspects of embodiments of this application or specific aspects in which embodiments of this application may be used. It should be understood that the embodiments of this application may be used in other aspects, and may include structural or logical changes not depicted in the accompanying drawings. Therefore, the following detailed descriptions shall not be construed as limitative, and the scope of this application is defined by the appended claims. For example, it should be understood that disclosed content with reference to described methods is also applicable to a corresponding device or system configured to perform the method, and vice versa. For example, if one or more specific method operations are described, a corresponding device may include one or more units such as functional units for performing the described one or more method operations (for example, one unit performs the one or more operations; or a plurality of units, each of which performs one or more of the plurality of operations), even if such one or more units are not explicitly described or illustrated in the accompanying drawings. In addition, for example, if a specific apparatus is described based on one or more units such as a functional unit, a corresponding method may include one operation used to perform one or more functionalities of one or more units (for example, one operation used to perform one or more functionalities of one or more units; or a plurality of operations, each of which is used to perform one or more functionalities of one or more units in a plurality of units), even if such one or more of operations are not explicitly described or illustrated in the accompanying drawings. Further, it should be understood that features of various example embodiments and/or aspects described in this specification may be combined with each other, unless otherwise specified.

In the embodiments of this application, there are mainly two moving image capture technologies: a frame based high-speed camera and an event based image capture camera (event based camera). The frame based high-speed camera can capture about 1000 frames per second, and can capture an object moving at a high speed, but needs to collect a large amount of data, resulting in high energy consumption and poor efficiency. In contrast, unlike the frame based high-speed camera, the event based high-speed camera is a research achievement of bionics, and can respond to a pulse generated from a pixel-level light change in a field of view that is caused by a motion. Image capture is performed only when an "event" occurs (for example, a light intensity in the field of view increases or decreases). If no "event" occurs, image capture is not performed. The event based high-speed camera has been widely used in the field of moving image capture due to its fast data collection, small collection amount, and low power consumption.

An image sensor in the event based high-speed camera may be a dynamic vision sensor (DVS), also referred to as a brain-like camera DVS. A pixel collection circuit in the DVS mimics a retinal imaging theory. FIG. 1 is a schematic diagram of a structure of a pixel collection circuit designed by mimicking the retinal imaging theory according to an embodiment of this application. Referring to FIG. 1, the pixel collection circuit 10 may include an image receiver 11, a differential circuit 12, and a comparison and output circuit 13. The image receiver 11, the differential circuit 12, and the comparison and output circuit 13 respectively correspond to a photoreceptor 21, a bipolar cell 22, and an ON-OFF ganglion cell 23 in an optic nerve 20.

In an imaging process of a retina, the bipolar cell 22 receives signal inputs from the photoreceptor 21, and after integrating the signal inputs, transmits the signal inputs to the ganglion cell 23, so as to divide the visual signals into ON and OFF signals and convert a continuous graded potential into a transient neuronal activity. In the pixel collection circuit in the DVS, the image receiver 11 converts a sensed optical signal into an electrical signal, and forms a logarithmic voltage value at Vlog; the differential circuit 12 uses Vlog as an input, and outputs an amplified voltage difference Vdiff after the input passes through a differential amplifier A; and finally, a comparator compares the input Vdiff with a specified threshold voltage, and outputs a pulse signal. For example, if Vdiff is greater than a positive threshold, a positive pulse signal is output; or if Vdiff is less than a negative threshold, a negative pulse signal is output. At least one of the positive pulse signal or the negative pulse signal are/is transmitted to an external circuit over a handshake protocol, so as to perform data communication and provide feedback to a reset switch RS in the differential circuit 12 for voltage reset, so that data communication can be performed when a next "event" occurs. In this way, by using the foregoing process, only when an "event" occurs (for example, a light intensity in a field of view increases or decreases), a pulse signal is generated to perform data communication with an external circuit to implement image capture, thereby greatly reducing a data collection amount and reducing energy consumption.

However, both Vlog and Vdiff in the foregoing pixel collection circuit are analog signals, and are prone to be interfered with by noise. Therefore, waveforms of the analog signals are changed in a process of long-distance transmission and multiple times of processing and amplification, causing a change to information in the signals, image distortion, and even signal interruption in a severe case. Further, the image receiver, the differential circuit, and the comparison and output circuit are all analog circuits. To resolve the foregoing problems such as interference and distortion, circuit structures are relatively complex, and debugging is relatively difficult.

Therefore, to resolve the foregoing problems, an embodiment of this application provides a pixel collection circuit. The pixel collection circuit may be applied to a DVS. The DVS may be disposed in the foregoing event based high-speed camera, for example, a high-speed camera in a device such as a mobile phone, a surveillance camera, or an event data recorder. The device may be configured in scenarios such as assisted driving, automated driving, smart home, and safe city.

Figure 2:
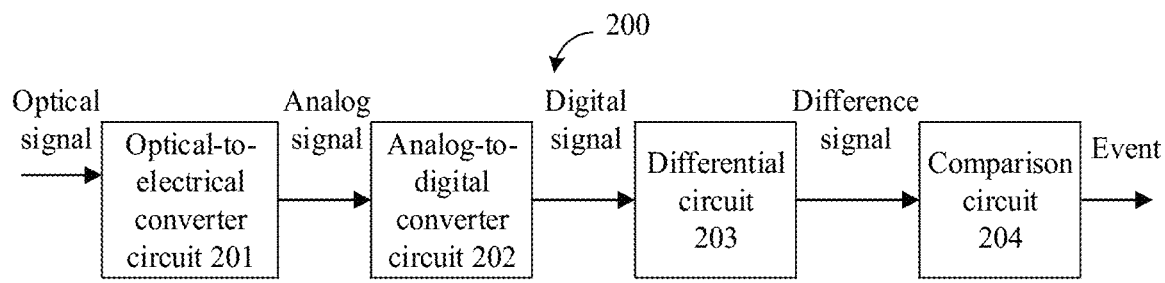
FIG. 2 is a schematic diagram of a structure of a pixel collection circuit according to an embodiment of this application.

FIG. 2 is a schematic diagram of a structure of a pixel collection circuit according to an embodiment of this application. Referring to FIG. 2, a pixel collection circuit 200 may include an optical-to-electrical converter circuit 201, an analog-to-digital converter (ADC) circuit 202, a differential circuit 203, and a comparison circuit 204.

Herein, the optical-to-electrical converter circuit 201 first converts a collected optical signal into an analog signal, and outputs the analog signal to the ADC 202. Then, the ADC 202 performs analog-to-digital conversion on the analog signal to obtain a digital signal of a current triggering moment, and outputs the digital signal of the current triggering moment to the differential circuit 203. Next, the differential circuit 203 obtains a difference signal between a digital signal of a previous triggering moment and the digital signal of the current triggering moment, and outputs the difference signal to the comparison circuit 204. Finally, the comparison circuit 204 compares the difference signal with a preset threshold to output a pulse signal. The pulse signal herein is used to indicate whether an event occurs. It can be learned that, the ADC 202 converts the analog signal into the digital signal, and the pixel collection circuit in the DVS is implemented by using a digital component. This can reduce noise introduced by instability of the analog signal in the DVS, and further reduce interference in the DVS. Further, a structure of the pixel collection circuit implemented by using the digital component is relatively simple and convenient for debugging.

It should be noted that, the foregoing event may be whether the optical signal collected by the optical-to-electrical converter circuit changes, that is, whether a light intensity in a field of view that is collected by the optical-to-electrical converter circuit changes, for example, the light intensity increases or decreases.

The following describes the pixel collection circuit in detail.

First, the optical-to-electrical converter circuit 201 is described.

Figure 3:
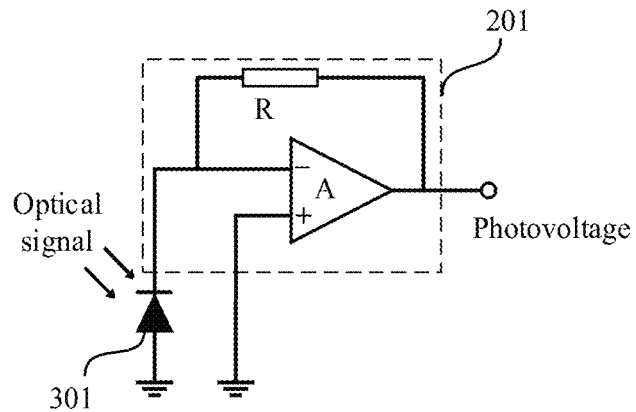
FIG. 3 is a schematic diagram of an optical-to-electrical converter circuit according to an embodiment of this application.

The optical-to-electrical converter circuit 201 is configured to convert a received optical signal into an electrical signal, generate a corresponding photovoltage (that is, an analog signal), and send the photovoltage to the ADC 202. For a possible implementation of the optical-to-electrical converter circuit 202, refer to FIG. 3. The optical signal is input through a photodiode 301, and is converted into the photovoltage after passing through the optical-to-electrical converter circuit 202 shown in FIG. 3. Certainly, the optical-to-electrical converter circuit 201 may alternatively be implemented by using a circuit or apparatus in any other form that has an optical-to-electrical conversion function. This is not specifically limited in this embodiment of this application.

A value of the photovoltage is usually in a linear direct proportion to a light intensity. For example, the photovoltage may be an original voltage value V output by an amplifier A, or may be the logarithmic voltage value Vlog described in the foregoing embodiment (Vlog is a value obtained after logarithmic calculation is performed on the original voltage value V). Certainly, the photovoltage may alternatively be a voltage value accumulated in a short period of time. In actual application, the photovoltage may alternatively be another case. Correspondingly, for a different photovoltage, the optical-to-electrical converter circuit may alternatively be a circuit or apparatus in another form. This is not specifically limited in this embodiment of this application.

Next, the ADC 202 is described.

The ADC 202 is configured to convert the photovoltage input from the optical-to-electrical converter circuit 201 into a digital signal, and output the digital signal to the differential circuit 203. For example, the ADC 202 is used to convert the analog original voltage value V into a digital signal D1, and output D1 to the differential circuit 203. In actual application, the ADC 202 may be a parallel flash ADC, a successive approximation ADC, an integrating ADC, a voltage-to-frequency ADC, or the like. This is not specifically limited in this embodiment of this application. Preferably, to ensure that a conversion speed matches a high-speed photographing requirement of the DVS, the parallel flash ADC or the successive approximation ADC may be selected to implement the ADC 202. Certainly, the ACD 202 may alternatively be implemented by using a circuit or apparatus in another form that has an analog-to-digital conversion function. This is not specifically limited in this embodiment of this application.

Further, to meet the photographing requirement of the DVS, a resolution (that is, a bit quantity of the digital signal) of the ADC may be set as required. For example, the resolution may be set to 2 bits, 4 bits, 8 bits, or 16 bits. This is not specifically limited. A larger bit quantity indicates higher precision of the ADC, but leads to increasing components in the pixel collection circuit and consequently higher overall power consumption and a larger overall area of the pixel collection circuit. A person skilled in the art may select a proper resolution as required.

For example, for a 2-bit voltage ADC, if a reference voltage is set to 1 V, a digital signal output by the ADC may be the following four codes in total: 00, 01, 10, and 11, and the four codes may correspond to the following photovoltages input by the optical-to-electrical converter circuit: 0-0.25 V, 0.26-0.5 V, 0.51-0.75 V, and 0.76-1 V. It is assumed that, when the photovoltage input by the optical-to-electrical converter circuit to the ADC is 0.8 V, the digital signal output by the ADC is 11.

For a 4-bit voltage ADC, if a reference voltage is set to 1 V, a digital signal output by the ADC may be the following 16 codes in total: 0000, 0001, 0010, 0011, 0100, 0101, 0110, 0111, 1000, 1001, 1010, 1011, 1100, 1101, 1110, and 1111, and the 16 codes may correspond to the following photovoltages input by the optical-to-electrical converter circuit: 0-0.0625 V, 0.0626-0.125 V, . . . , 0.8750-0.9375 V, and 0.9376-1 V. It is assumed that, when the photovoltage input by the optical-to-electrical converter circuit to the ADC is 0.8 V, the digital signal output by the ADC is 1100.

Subsequently, the differential circuit 203 is described.

The differential circuit 203 is configured to obtain the difference signal between the digital signal of the previous triggering moment and the digital signal of the current triggering moment, and output the difference signal to the comparison circuit 204.

In one embodiment, the differential circuit 203 may include a storage circuit and a subtraction circuit. An input end of the storage circuit is electrically connected to an output end of the ADC, an output end of the storage circuit is electrically connected to a first input end of the subtraction circuit, a second input end of the subtraction circuit is electrically connected to the output end of the ADC, and an output end of the subtraction circuit is electrically connected to an input end of the comparison circuit.

The storage circuit is configured to: buffer, at a triggering moment, the digital signal output by the ADC, and output, to the subtraction circuit, the digital signal buffered at the current triggering moment; and keep a buffered value unchanged at a non-triggering moment, and output, to the subtraction circuit, a digital signal buffered at a previous triggering moment; and the subtraction circuit is configured to calculate the difference signal based on the digital signal of the previous triggering moment that is output by the storage circuit and the digital signal of the current triggering moment that is output by the ADC, and output the difference signal to the comparison circuit.

It should be noted that, the storage circuit and the subtraction circuit have different triggering moments.

Figure 4:
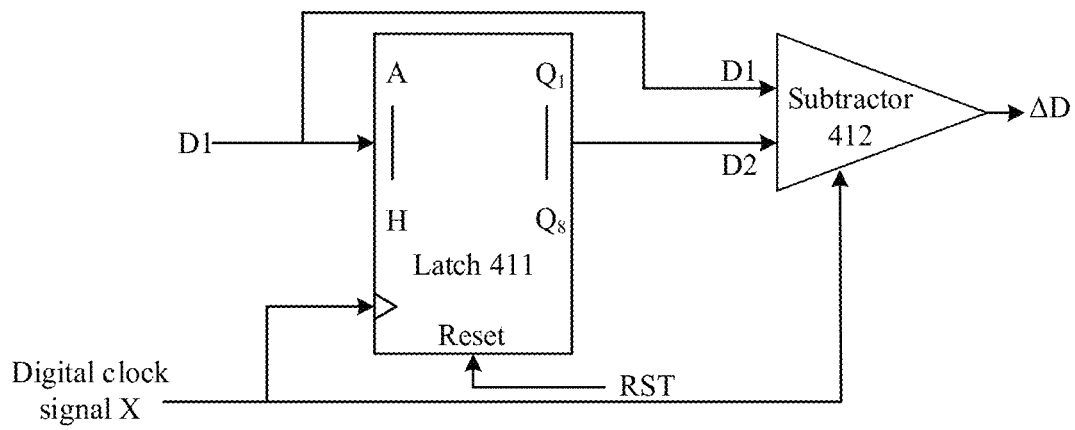
FIG. 4 is a schematic diagram of a differential circuit according to an embodiment of this application.

In actual application, the storage circuit may be one of the following digital components: a memory, a latch, a trigger, or a register. Certainly, the storage circuit may alternatively be implemented by using another digital component or circuit that has a storage function. This is not specifically limited. The subtraction circuit may be implemented by using a subtractor, or may alternatively be implemented by using another digital component or circuit that has a difference calculation capability. This is not specifically limited. A bit quantity of the storage circuit is consistent with the resolution of the ADC For example, FIG. 4 is a schematic diagram of a differential circuit according to an embodiment of this application. Referring to FIG. 4, the differential circuit 203 includes a latch 411 and a subtractor 412. The ADC 202 outputs D1 to an input end of the latch 411. The latch 411 buffers D1 at a triggering moment, and outputs a buffered digital signal D2. In this case, D1 and D2 may be the same or different. The latch 411 outputs D2 to a first input end of the subtractor 412, and the ADC 202 outputs D1 to a second input end of the subtractor 412. The subtractor 412 performs difference calculation on D1 and D2 at a triggering moment to obtain the difference signal ΔD satisfying ΔD=D1−D2, and the subtractor 412 outputs ΔD to the comparison circuit 204.

It should be noted that, because the latch 411 and the subtractor 412 are triggered at different moments, when the latch 411 is triggered at moment T1, the latch 411 buffers the digital signal D1 of moment T1, and outputs buffered D2. In this case, D2=D1. Then, when the subtractor 412 is triggered at moment T2, the subtractor 412 calculates ΔD satisfying ΔD=D1−D2=0. When the latch 411 is not triggered at moment T, the latch 411 outputs buffered D2, which is actually a digital signal D1' buffered by the latch 411 at a previous moment T0. In this case, D2≠D1. Then, when the subtractor 412 is triggered at moment T2, the subtractor 412 calculates ΔD satisfying ΔD=D1−D2=D1−D1'.

In some possible implementations, the subtraction circuit may be alternatively implemented by using an absolute value subtractor. The absolute value subtractor is configured to calculate an absolute value of the difference signal based on the digital signal buffered at the previous triggering moment that is output by the storage circuit and the digital signal of the current triggering moment that is output by the ADC. Still referring to FIG. 4, the subtractor 412 (namely, the absolute value subtractor) performs difference calculation on D1 and D2 at the triggering moment, and obtains the absolute value of the difference signal. In this case, ΔD=|D1−D2|.

Then, the comparison circuit 204 is described.

The comparison circuit 204 is configured to compare the difference signal or the absolute value of the difference signal with a preset threshold to output a pulse signal. The pulse signal is used to indicate whether an event occurs.

In actual application, the comparison circuit 204 may be implemented by using a digital comparator. The digital comparator and the subtractor have different triggering moments, and the digital comparator and the memory have a same triggering moment. Certainly, another digital component or circuit that has a value comparison function may be used for implementation. This is not specifically limited in this embodiment of this application.

Figure 5A:
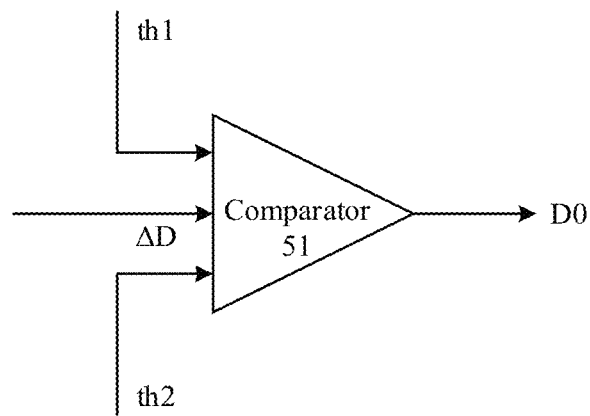
FIG. 5A is schematic diagram 1 of a comparison circuit according to an embodiment of this application.

Specifically, the foregoing event refers to whether a light intensity in a field of view increases or decreases. Correspondingly, the foregoing preset threshold may be set to a first threshold th1 and a second threshold th2. The first threshold th1 is greater than the second threshold th2. FIG. 5A is schematic diagram 1 of a comparison circuit according to an embodiment of this application. Referring to FIG. 5A, after obtaining the difference signal ΔD, the subtraction circuit outputs the difference signal ΔD to a comparator 501. The comparator 501 compares the difference signal ΔD with each of the first threshold th1 and the second threshold th2. When the difference signal ΔD is greater than or equal to the first threshold th1, the comparator 501 outputs a pulse signal DO whose level is a first value (for example, D0=10). In this case, the pulse signal DO indicates that the event occurs, and the light intensity in the field of view increases. When the difference signal ΔD is less than or equal to the second threshold th2, the comparator 501 outputs the pulse signal D0 whose level is a second value (for example, D0=11). In this case, the pulse signal D0 indicates that the event occurs, and the light intensity in the field of view decreases. When the difference signal ΔD is less than the first threshold th1 and greater than the second threshold th2, the comparator 501 outputs the pulse signal D0 whose level is a third value (for example, D0=01). In this case, the pulse signal D0 indicates that the event does not occur, and the light intensity in the field of view does not change or changes slightly. When the comparator 501 is not triggered, the comparator 501 outputs the pulse signal D0 whose level is a fourth value (for example, D0=00). In this case, the pulse signal D0 indicates that the event does not occur.

It should be noted that, the first threshold th1 and the second threshold th2 may be empirical values, and a person skilled in the art may set both thresholds as required. This is not specifically limited in this embodiment of this application.

Figure 5B:
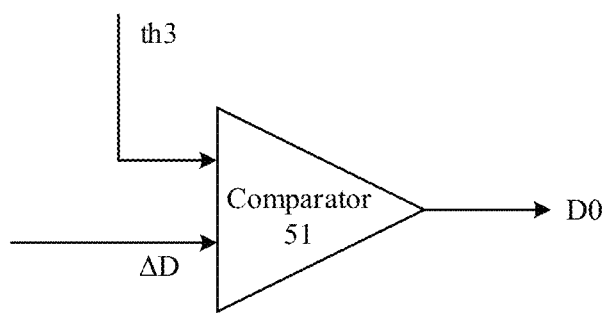
FIG. 5B is schematic diagram 2 of a comparison circuit according to an embodiment of this application.

Further, the subtraction circuit uses an absolute value subtractor to simplify a circuit structure of the pixel collection circuit. In this case, a preset threshold th3 may be set to indicate whether the event occurs. FIG. 5B is schematic diagram 2 of a comparison circuit according to an embodiment of this application. Referring to FIG. 5B, after obtaining the difference signal ΔD, the subtraction circuit outputs the difference signal ΔD to a comparator 501. The comparator 501 compares the difference signal ΔD with the preset threshold th3. When an absolute value ΔD of the difference signal is greater than the preset threshold th3, the comparator 51 outputs a pulse signal D0 whose level is a fifth value (for example, D0=1). In this case, the pulse signal D0 indicates that the event occurs, and the light intensity in the field of view increases or decreases. When the absolute value ΔD of the difference signal is less than or equal to the preset threshold th3, the comparator 501 outputs the pulse signal D0 whose level is a sixth value (for example, D0=0). In this case, the pulse signal D0 indicates that the event does not occur, and the light intensity in the field of view does not change or changes slightly. When the comparator 501 is not triggered, the comparator 501 outputs the pulse signal D0 whose level is the sixth value. In this case, the pulse signal D0 indicates that the event does not occur.

It should be noted that, the preset threshold th3 may be an empirical value, and a person skilled in the art may set the threshold as required. This is not specifically limited in this embodiment of this application.

In one embodiment, to ensure operation of the differential circuit 203 and the comparison circuit 202, the pixel collection circuit may further include a clock signal generation circuit. The clock signal generation circuit is configured to generate a digital clock signal X, and X is separately input to the differential circuit 203 and the comparison circuit 204 to control the differential circuit 203 and the comparison circuit 204. X is a pulse signal with a first frequency, and the differential circuit 203 and the comparison circuit 204 may be triggered when X is in an enabled state. In this embodiment of this application, a frequency (namely, the first frequency) of X is the same as a frequency of D1, that is, cycles of X are aligned with those of D1. Certainly, the frequency of D1 may alternatively be an integer multiple of the frequency of X, for example, the frequency of D1 may be 2 times, 3 times, or 5 times of the frequency of X, provided that the cycles of X are aligned with those of D1. This is not specifically limited in this embodiment of this application. When X is on a falling edge, X is in the enabled state. Certainly, in another embodiment, X may alternatively be in the enabled state when X is on a rising edge. This is not specifically limited in this embodiment of this application.

Further, the differential circuit 203 may control the storage circuit by using both the digital clock signal and a reset signal. In this case, the pixel collection circuit may further include a reset circuit, configured to generate a reset signal based on the pulse signal, and output the reset signal to the storage circuit. The reset signal is used to control, together with the digital clock signal in the enabled state, the storage circuit to update a buffered digital signal.

Specifically, an input end of the reset circuit is electrically connected to an output end of the comparison circuit 204, and an output end of the reset circuit is electrically connected to a reset signal input end of the storage circuit 202. In this case, the digital clock signal and the reset signal jointly control the storage circuit. In one embodiment, when the digital clock signal is in the enabled state and the storage circuit receives the reset signal, the storage circuit is triggered to update the buffered digital signal. Then, when the pulse signal indicates that the event occurs, the reset circuit generates a reset signal, and outputs the reset signal to the storage circuit. If the digital clock signal is in the enabled state (for example, the digital clock signal is on a falling edge), the storage circuit is triggered to update the buffered digital signal. In one embodiment, when the pulse signal indicates that the event does not occur, the reset circuit may not generate a reset signal, and the storage circuit cannot receive a reset signal. In this case, regardless of whether the digital clock signal is in the enabled state, the storage circuit is not triggered, and a buffered value of the storage circuit remains unchanged. In this case, the buffered value of the storage circuit is the digital signal buffered at the previous triggering moment. In one embodiment, when the pulse signal indicates that the event occurs, the reset circuit may further generate a reset signal in an enabled state (for example, the reset signal is RST1). When the pulse signal indicates that the event does not occur, the reset circuit may alternatively generate a reset signal in a disabled state (for example, the reset signal is RST2). In optional actual application, the reset circuit may further generate a reset signal in another form. This is not specifically limited in this embodiment of this application. In one embodiment, when the digital clock signal and the reset signal are both in the enabled state, the storage circuit is triggered to update the buffered digital signal; or when either of the digital clock signal and the reset signal is in the disabled state, the storage circuit is not triggered, and keeps the buffered value unchanged. In this case, the buffered value of the storage circuit is the digital signal buffered at the previous triggering moment.

For example, as shown in FIG. 4, the comparison circuit 204 outputs D0 to the reset circuit, and when D0 indicates that the event occurs, the reset circuit generates a reset signal RST (for example, RST=RST1), and outputs the reset signal RST to a reset input end of the latch 411. In this case, if X is on a falling edge (that is, X is in the enabled state), the latch 411 is triggered to update a buffered value by buffering D1 input by the ADC 202 at this moment, and output, to the subtractor 412, D2 (which is equal to D1) buffered at the current moment. When D0 indicates that the event does not occur, the reset circuit generates a reset signal RST (for example, RST=RST2), and outputs the reset signal to the reset input end of the latch 411. In this case, if X is on a rising edge or keeps a level unchanged (that is, X is in the disabled state), the latch 411 is not triggered, keeps the buffered value D2 unchanged, and outputs, to the subtractor 412, the digital signal D2 (which is equal to D1') buffered at the previous moment. Herein, RST1≠RST2. For example, when D0=1, RST=1; or when D0=0, RST=0. In this embodiment of this application, an output value of D0 is not limited to the foregoing values, and may be any other value that is capable of differentiating between different states of D0. This is not limited.

In this embodiment of this application, when the light intensity in the field of view of the DVS is relatively low, the pixel collection circuit may further include an accumulation circuit to determine whether the event occurs. The accumulation circuit may be an analog accumulation circuit or a digital accumulation circuit. When the accumulation circuit is an analog accumulation circuit, the accumulation circuit is disposed between the optical-to-electrical converter circuit 201 and the ADC 202, and is configured to accumulate, at a non-triggering moment, an analog signal output by the optical-to-electrical converter circuit 201, and output an accumulated analog signal to the ADC 202 at a triggering moment. When the accumulation circuit is a digital accumulation circuit, the accumulation circuit is disposed between the ADC 202 and the differential circuit 203, and is configured to accumulate, at a non-triggering moment, a digital signal output from the ADC 202, and output the digital signal to the differential circuit 203 at a triggering moment.

In actual application, when the accumulation circuit is an analog accumulation circuit, the accumulation circuit may be implemented by using an analog buffer. An input end of the analog buffer is electrically connected to an output end of the optical-to-electrical converter circuit 201, and an output end of the analog buffer is electrically connected to an input end of the ADC 202. When the accumulation circuit is a digital accumulation circuit, the accumulation circuit may be implemented by using a digital buffer. An input end of the digital buffer is electrically connected to the output end of the ADC 202, and an output end of the digital buffer is electrically connected to an input end of the differential circuit 203.

It should be noted that, operation of the digital buffer needs to be triggered by a digital clock signal Y. The digital clock signal Y is a pulse signal with a second frequency. The second frequency of the digital clock signal Y may usually be the same as the first frequency of the digital clock signal X. Cycles of the digital clock signal Y are aligned with those of the digital clock signal X.

Figure 6:
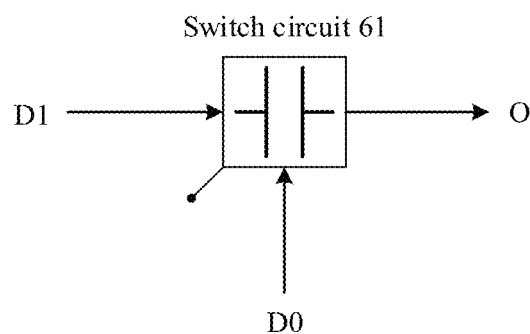
FIG. 6 is a schematic diagram of a switch circuit according to an embodiment of this application.

In one embodiment, the pixel collection circuit may further include a switch circuit. FIG. 6 is a schematic diagram of a switch circuit according to an embodiment of this application. Referring to FIG. 6, a first input end of the switch circuit 601 is electrically connected to the output end of the ADC 202, and a second input end of the switch circuit 601 is electrically connected to the output end of the comparison circuit 204. Then, the switch circuit 601 is configured to receive the digital signal D1 output by the ADC 202 and the pulse signal D0 output by the comparison circuit 204; and when the pulse signal D0 indicates that the event occurs, output a digital signal O. For example, when D0=1, the switch circuit is on, and outputs O satisfying O=D1; or when D0=0, the switch circuit is off, and outputs O satisfying O=0 or does not output O. Certainly, when D0=1, the switch circuit is on, and outputs O satisfying O=D1; or when D0=0, the switch circuit stays on, and keeps outputting O satisfying O=D1. In this embodiment of this application, an output value of D0 is not limited to the foregoing values, and may be any other value that is capable of differentiating between different states of D0. This is not limited.

In one embodiment, in addition to the digital signal D1 obtained after the ADC 202, the original analog signal output by the optical-to-electrical converter circuit 201 is input to the first input end of the switch circuit. In this case, the switch circuit receives the analog signal output by the optical-to-electrical converter circuit 201 and the pulse signal output by the comparison circuit 204; or when the pulse signal indicates that the event occurs, outputs the analog signal. Alternatively, the accumulated analog signal output by the analog accumulation circuit may further be input to the first input end of the switch circuit. In this case, the switch circuit receives the accumulated analog signal output by the accumulation circuit and the pulse signal output by the comparison circuit 204; or when the pulse signal indicates that the event occurs, outputs an accumulated analog signal. This is not specifically limited in this embodiment of this application.

In actual application, the switch circuit may be implemented by using a component such as a relay or a double-pole double-throw switch. Certainly, another digital component or circuit that has a double-input single-output switch function may alternatively be used. This is not specifically limited in this embodiment of this application.

The following describes the pixel collection circuit by using specific examples.

Embodiment 1

Figure 7:
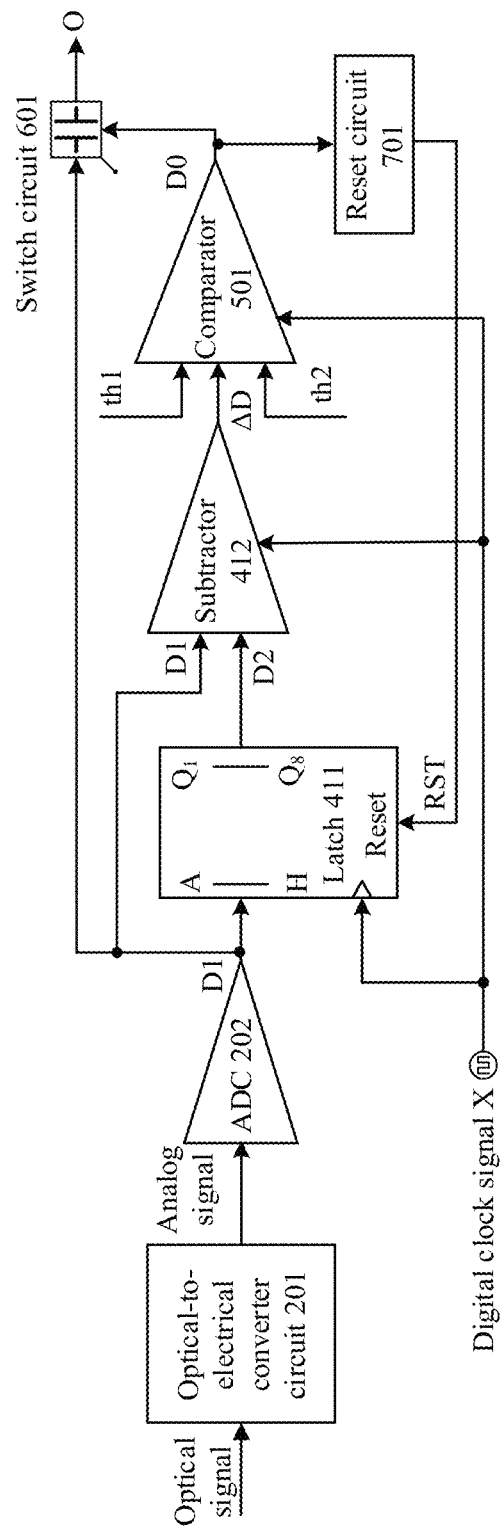
FIG. 7 is schematic circuit diagram 1 of a pixel collection circuit according to an embodiment of this application.

FIG. 7 is schematic circuit diagram 1 of a pixel collection circuit according to an embodiment of this application. Referring to FIG. 7, the pixel collection circuit includes the optical-to-electrical converter circuit 201, the ADC 202, the latch 411, the subtractor 412, a reset circuit 701, the comparator 501, and the switch circuit 601. In this case, the optical-to-electrical converter circuit 201 collects an optical signal in the field of view, converts the optical signal into an analog signal, and outputs the analog signal to the ADC 202. The ADC 202 converts the analog signal into a digital signal D1, and inputs D1 to the latch 411, the subtractor 412, and the switch circuit 601. The latch 411 buffers D1, and outputs a buffered value D2 to the subtractor 412. The subtractor 412 performs difference calculation on D1 and D2 that are input, to generate a difference signal $\Delta D$, and inputs $\Delta D$ to the comparator 501 for comparison with the first threshold th1 and the second threshold th2. When $\Delta D$ is greater than or equal to th1 and/or $\Delta D$ is less than or equal to th2, the comparator 501 outputs D0 satisfying D0=1, indicating that the event occurs. On the contrary, when $\Delta D$ is less than th1 and greater than th2 or the comparator 501 is not triggered, the comparator 501 outputs D0 satisfying D0=0, indicating that the event does not occur. Then, the comparator 501 outputs D0 to the switch circuit 601. When D0=1, the switch circuit 601 is on and outputs O satisfying O=D1. When D0=0, the switch circuit 601 is off and outputs O satisfying O=0 or provides no output.

Further, when D0=1, the reset circuit 701 is triggered, outputs a reset signal RST or outputs RST satisfying RST=1, and triggers the latch 411 together with a digital clock signal X (in this case, X is on a falling edge); and the latch 411 updates the buffered value and outputs the buffered value. When D0=0, the reset circuit 701 is not triggered, and does not output a reset signal RST or outputs RST satisfying RST=0; in this case, the latch 411 is not triggered, and the latch 411 keeps the buffered value unchanged, and outputs a buffered value of a previous triggering moment.

Figure 8:
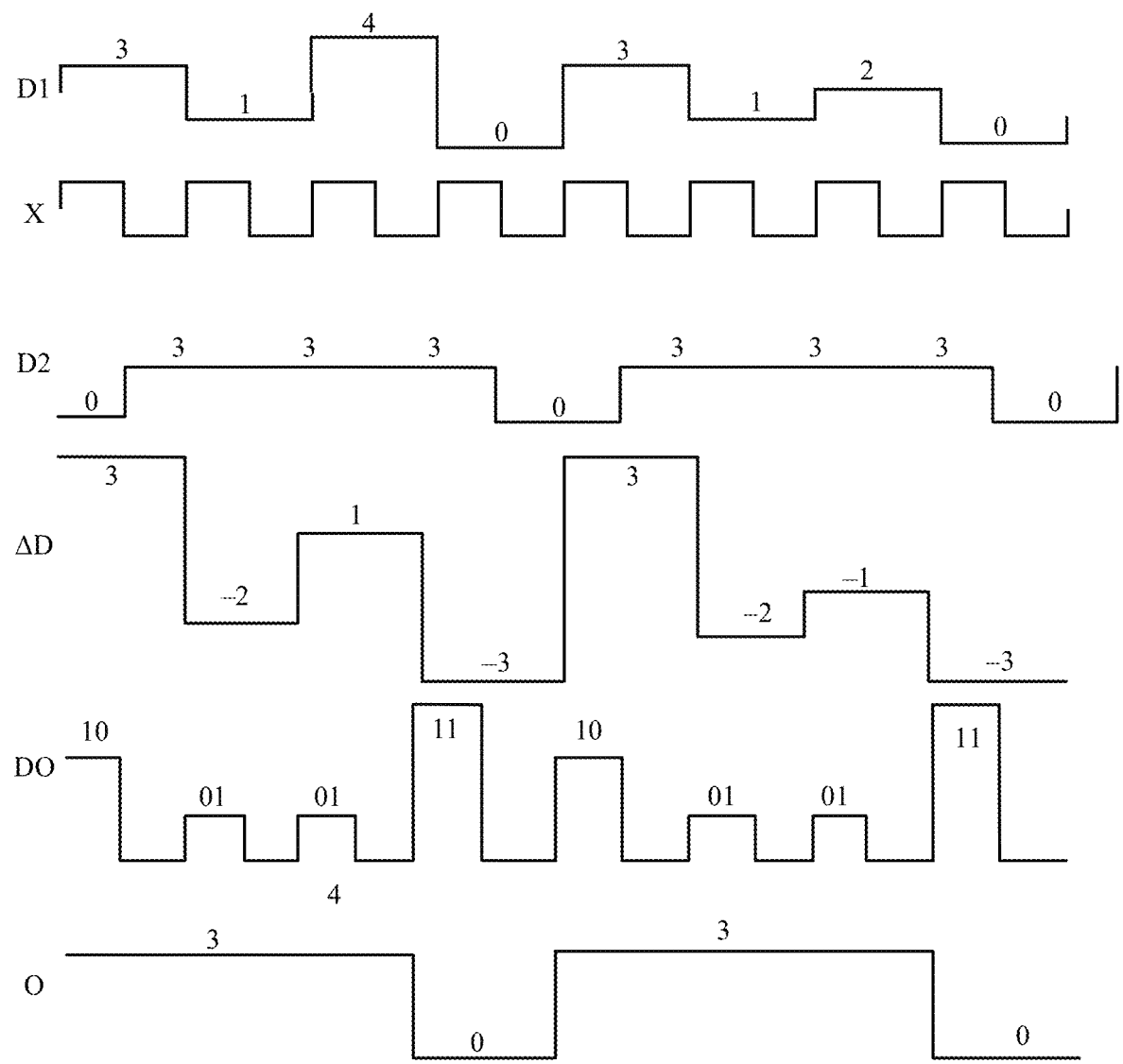
FIG. 8 is a schematic diagram of a time sequence of a pixel collection circuit according to an embodiment of this application.

With reference to the circuit shown in FIG. 7, FIG. 8 is a schematic diagram of a time sequence of the pixel collection circuit according to an embodiment of this application. Referring to FIG. 8, it is assumed that D1 obtained through conversion by the ADC 202 follows a time sequence: D1=3 (011), 1 (001), 4 (100), 0 (000), 3 (011), 1 (001), 2 (010), 0 (000). As described in the foregoing embodiment, a frequency of X is twice that of D1 (that is, X and D1 have same cycles). Therefore, at an initial moment, D2=0 (000), th1=3, and th2=−3. In this case, $\Delta D$=3 and is equal to th1, D0=10, and O=3. In the second half of the first cycle of X, RST and X trigger the latch 411 to latch the value of D1, that is, D2=3 (011). In the second cycle of X, D1=1 (001), and D2=3 (011). In this case, $\Delta D$=−2, $\Delta D$ is less than th1 and greater than th2, and D0=01. The latch 411 is not triggered, and does not latch the current value of D1 but retains the original value, that is, D2=3 (011). Therefore, it can be learned that, values of $\Delta D$ output by the subtractor 412 in the time sequence are 3, −2, 1, −3, 3, −2, −1, and −3. Then, outputs of D0 are 10, 01, 01, 11, 10, 01, 01, 11, and 01. In this embodiment, the latch 411 is triggered in the second half of a cycle of X, and the subtractor 412 is triggered in the first half of a cycle of X (the subtractor keeps an output unchanged throughout the second half of the cycle). However, different settings may also be provided in actual application, so that the latch and the subtractor are triggered at different moments. This is not specifically limited in this embodiment of this application.

Further, still referring to FIG. 8, at a moment when D0 is 10 or 11, outputs of O are current values of D1, which are 3, 0, 3, and 0. At a moment when D0 is 01 or 00, O maintains an output of a previous moment. Certainly, in actual application, the signal O may not be output at the moment when D0 is 01 or 00, or O satisfying O=0 may be output. This is not specifically limited in this embodiment of this application, provided that an output value of O can indicate whether the event occurs.

Embodiment 2

Figure 9:
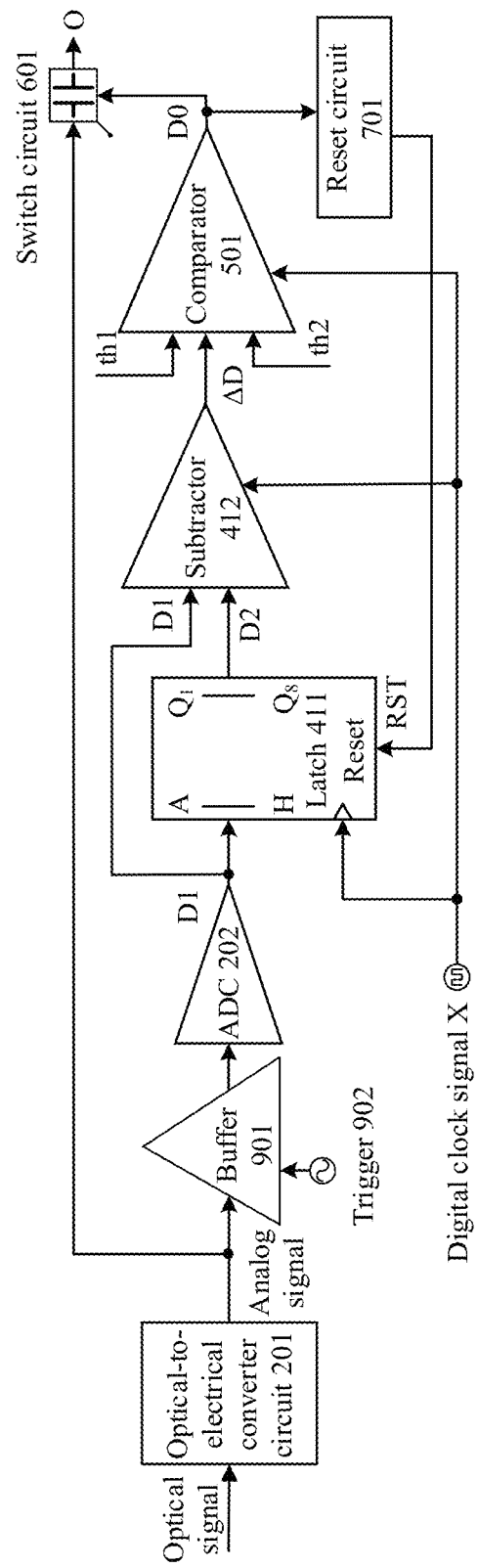
FIG. 9 is schematic circuit diagram 2 of a pixel collection circuit according to an embodiment of this application.

Based on Embodiment 1, an analog buffer is added between the optical-to-electrical converter circuit and the ADC to obtain a sum of light intensities in the field of view within a period of time. In this case, when a light intensity is low, for example, at night, a total of light intensities within a period of time may be collected and sent to a subsequent circuit for processing by the DVS. A trigger of the buffer sends triggering signals to the buffer at intervals. An interval between two triggering signals is an interval for the buffer to accumulate light intensities. FIG. 9 is schematic circuit diagram 2 of a pixel collection circuit according to an embodiment of this application. Referring to FIG. 9, the pixel collection circuit includes the optical-to-electrical converter circuit 201, a buffer 901, a trigger 902, the ADC 202, the latch 411, the subtractor 412, the reset circuit 701, the comparator 501, and the switch circuit 601. In this case, the optical-to-electrical converter circuit 201 collects an optical signal in the field of view, converts the optical signal into an analog signal, and outputs the analog signal to the buffer 901. The buffer 901 accumulates the analog signal in a period of time, and outputs an accumulated analog signal to the ADC 202. The ADC 202 converts the accumulated analog signal into a digital signal D1, and inputs D1 to the latch 411 and the subtractor 412. The latch 411 buffers D1, and outputs a buffered value D2 to the subtractor 412. The subtractor 412 performs difference calculation on D1 and D2 that are input, to generate a difference signal ΔD, and inputs ΔD to the comparator 501 for comparison with the first threshold th1 and the second threshold th2. When ΔD is greater than or equal to th1 and/or ΔD is less than or equal to th2, the comparator 501 outputs D0 satisfying D0=1, indicating that the event occurs. On the contrary, when ΔD is less than th1 and greater than th2 or the comparator 501 is not triggered, the comparator 501 outputs D0 satisfying D0=0, indicating that the event does not occur. Then, the comparator 501 outputs D0 to the switch circuit 601. When D0=1, the switch circuit 601 is on and outputs O as an original analog signal. When D0=0, the switch circuit 601 is off and outputs O satisfying O=0 or provides no output.

Further, when D0=1, the reset circuit 701 is triggered, outputs a reset signal RST or outputs RST satisfying RST=1, and triggers the latch 411 together with a digital clock signal X (in this case, X is on a falling edge); and the latch 411 updates the buffered value and outputs the buffered value. When D0=0, the reset circuit 701 is not triggered, and does not output a reset signal RST or outputs RST satisfying RST=0; in this case, the latch 411 is not triggered, and the latch 411 keeps the buffered value unchanged, and outputs a buffered value of a previous triggering moment.

In addition, in FIG. 9, an input to the switch circuit 601 may be the original analog signal output by the optical-to-electrical converter circuit 201. It should be understood that, the input to the switch circuit 601 may alternatively be the analog signal accumulated by the buffer 901, or may be D1 output by the ADC 202. This is not specifically limited in this embodiment of this application.

A working time sequence of the pixel collection circuit shown in FIG. 9 is similar to that in Embodiment 1, and details are not described herein again.

Embodiment 3

Figure 10:
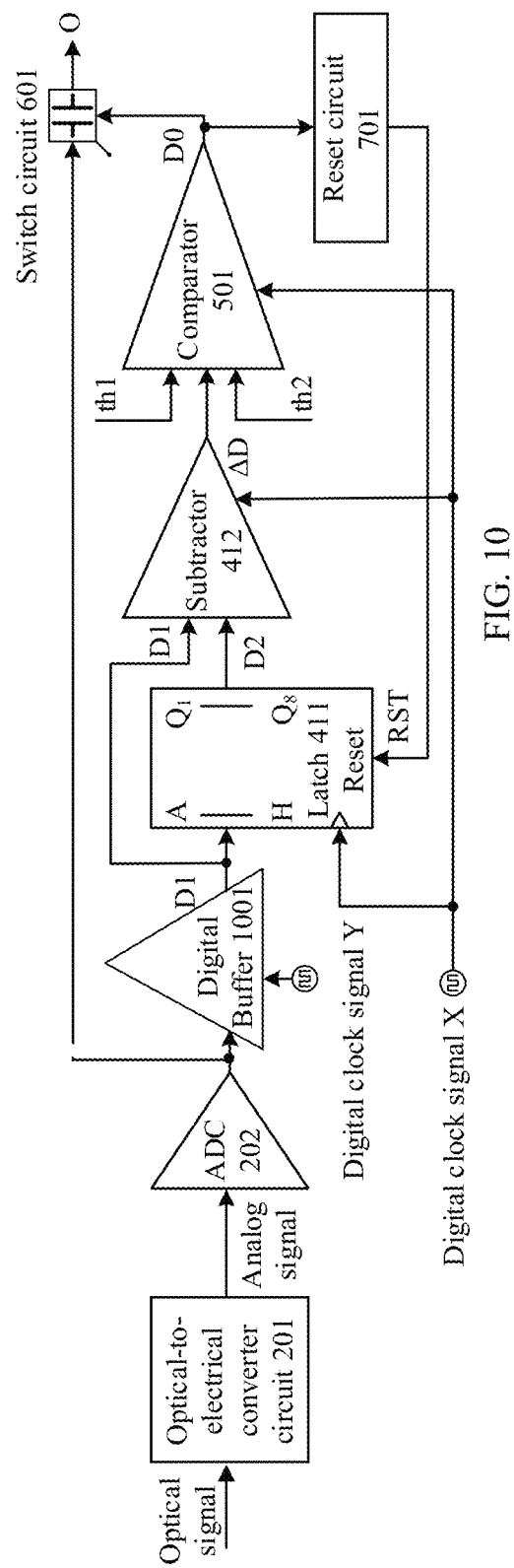
FIG. 10 is schematic circuit diagram 3 of a pixel collection circuit according to an embodiment of this application.

Based on Embodiment 1 or Embodiment 2, a digital buffer is added between the ADC and the latch 411 in this embodiment, so as to buffer a digital signal obtained through conversion by the ADC. Similar to the analog buffer in Embodiment 2, a digital clock signal Y triggers the digital buffer at intervals. An interval between two triggering moments is an interval for the buffer to accumulate the digital signal. Compared with the analog buffer in Embodiment 2, the digital buffer has higher precision and a more stable system output. FIG. 10 is schematic circuit diagram 3 of a pixel collection circuit according to an embodiment of this application. Referring to FIG. 10, the pixel collection circuit includes the optical-to-electrical converter circuit 201, the ADC 202, a digital buffer 1001, the latch 411, the subtractor 412, the reset circuit 701, the comparator 501, and the switch circuit 601. In this case, the optical-to-electrical converter circuit 201 collects an optical signal in the field of view, converts the optical signal into an analog signal, and outputs the analog signal to the ADC 202. The ADC 202 converts the analog signal into a digital signal D1, and outputs D1 to the digital buffer 1001. The digital buffer 1001 accumulates D1 in a period of time, and inputs the accumulated D1 to the latch 411 and the subtractor 412. The latch 411 buffers the accumulated D1, and outputs a buffered value D2 to the subtractor 412. The subtractor 412 performs difference calculation on the accumulated D1 and D2 that are input, to generate a difference signal ΔD, and inputs ΔD to the comparator 501 for comparison with the first threshold th1 and the second threshold th2. When ΔD is greater than or equal to th1 and/or ΔD is less than or equal to th2, the comparator 501 outputs D0 satisfying D0=1, indicating that the event occurs. On the contrary, when ΔD is less than th1 and greater than th2 or the comparator 501 is not triggered, the comparator 501 outputs D0 satisfying D0=0, indicating that the event does not occur. Then, the comparator 501 outputs D0 to the switch circuit 601. When D0=1, the switch circuit 601 is on and outputs O as an original analog signal. When D0=0, the switch circuit 601 is off and outputs O satisfying O=0 or provides no output.

Further, when D0=1, the reset circuit 701 is triggered, outputs a reset signal R or outputs R satisfying R=1, and triggers the latch 411 together with a digital clock signal X (in this case, X is on a falling edge); and the latch 411 updates the buffered value and outputs the buffered value. When D0=0, the reset circuit 701 is not triggered, and does not output a reset signal RST or outputs RST satisfying RST=0; in this case, the latch 411 is not triggered, and the latch 411 keeps the buffered value unchanged, and outputs a buffered value of a previous triggering moment.

In addition, in FIG. 10, an input to the switch circuit 601 may be D1 output by the ADC 202.

A working time sequence of the pixel collection circuit shown in FIG. 10 is similar to those in Embodiment 1 and Embodiment 2, and details are not described herein again.

Embodiment 4

Figure 11:
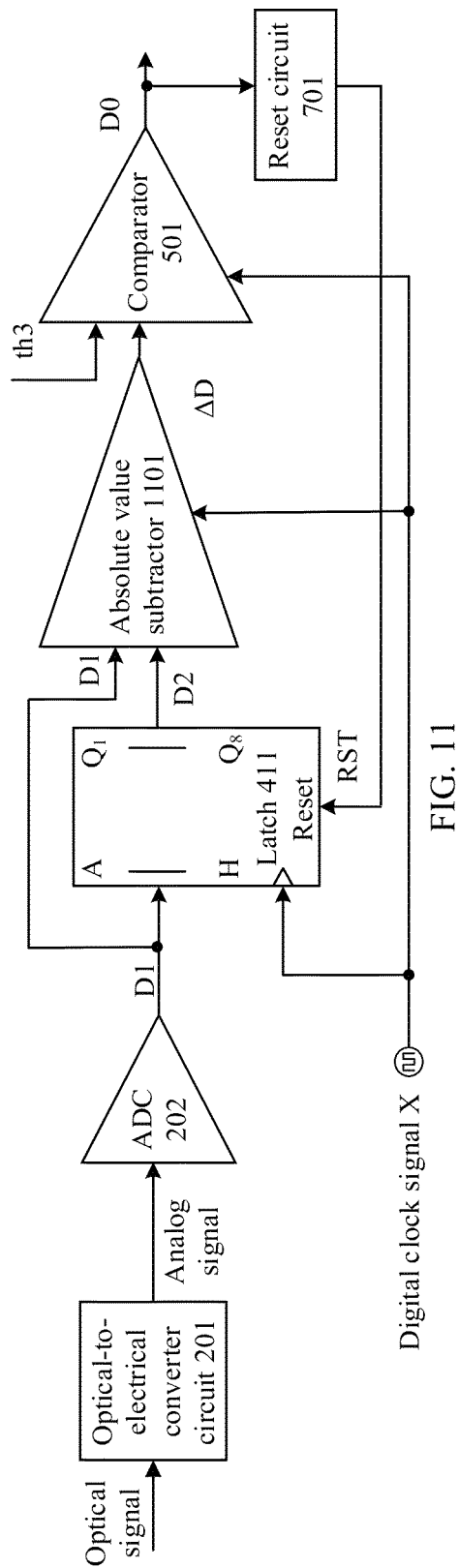
FIG. 11 is schematic circuit diagram 4 of a pixel collection circuit according to an embodiment of this application.

Based on Embodiment 1, to simplify the structure of the pixel collection circuit, the switch circuit is removed, and only an absolute value subtractor and the preset threshold th3 are used for comparison with ΔD. In this embodiment, an output of the subtractor is an absolute value of a difference between D1 and D2, that is, ΔD=|D2−D1|. FIG. 11 is schematic circuit diagram 4 of a pixel collection circuit according to an embodiment of this application. Referring to FIG. 11, the pixel collection circuit includes the optical-to-electrical converter circuit 201, the ADC 202, the latch 411, an absolute value subtractor 1101, the reset circuit 701, and the comparator 501. In this case, the optical-to-electrical converter circuit 201 collects an optical signal in the field of view, converts the optical signal into an analog signal, and outputs the analog signal to the ADC 202. The ADC 202 converts the analog signal into a digital signal D1, and inputs D1 to the latch 411 and the absolute value subtractor 1101. The latch 411 buffers D1, and outputs a buffered value D2 to the absolute value subtractor 1101. The absolute value subtractor 1101 performs difference calculation on D1 and D2 that are input, to generate an absolute value signal ΔD of a difference, and inputs ΔD to the comparator 501 for comparison with the preset threshold th3. When ΔD is greater than or equal to th3, the comparator 501 outputs D0 satisfying D0=1, indicating that the event occurs. On the contrary, when ΔD is less than th3 or the comparator 501 is not triggered, the comparator 501 outputs D0 satisfying D0=0, indicating that the event does not occur.

Further, when D0=1, the reset circuit 701 is triggered, outputs a reset signal R or outputs R satisfying R=1, and triggers the latch 411 together with a digital clock signal X (in this case, X is on a falling edge); and the latch 411 updates the buffered value and outputs the buffered value. When D0=0, the reset circuit 701 is not triggered, and does not output a reset signal R or outputs RST satisfying RST=0; in this case, the latch 411 is not triggered, and the latch 411 keeps the buffered value unchanged, and outputs a buffered value of a previous triggering moment.

A working time sequence of the pixel collection circuit shown in FIG. 11 is similar to those in Embodiment 1, Embodiment 2, and Embodiment 3, and details are not described herein again.

It should be noted that, the pixel collection circuit in this embodiment of this application may be shown in the foregoing embodiments and the accompanying drawings but is not limited thereto, and may further include another component and circuit. This is not specifically limited in this embodiment of this application.

In this embodiment of this application, the pixel collection circuit in the DVS is implemented by using a digital component, so as to reduce noise introduced by instability of an analog signal in the DVS, and further reduce interference in the DVS. Further, a structure of the pixel collection circuit implemented by using the digital component is relatively simple and convenient for debugging.

Based on an inventive concept same as that of the foregoing method, an embodiment of this application provides a DVS, including a dynamic vision sensor array and a peripheral circuit. The dynamic vision sensor array includes any one of the plurality of pixel collection circuits described in the embodiments of this application. The pixel collection circuit is configured to generate a pulse signal based on an optical signal and output the pulse signal to the peripheral circuit. The peripheral circuit is configured to generate an address event representation based on the pulse signal.

Figure 12:
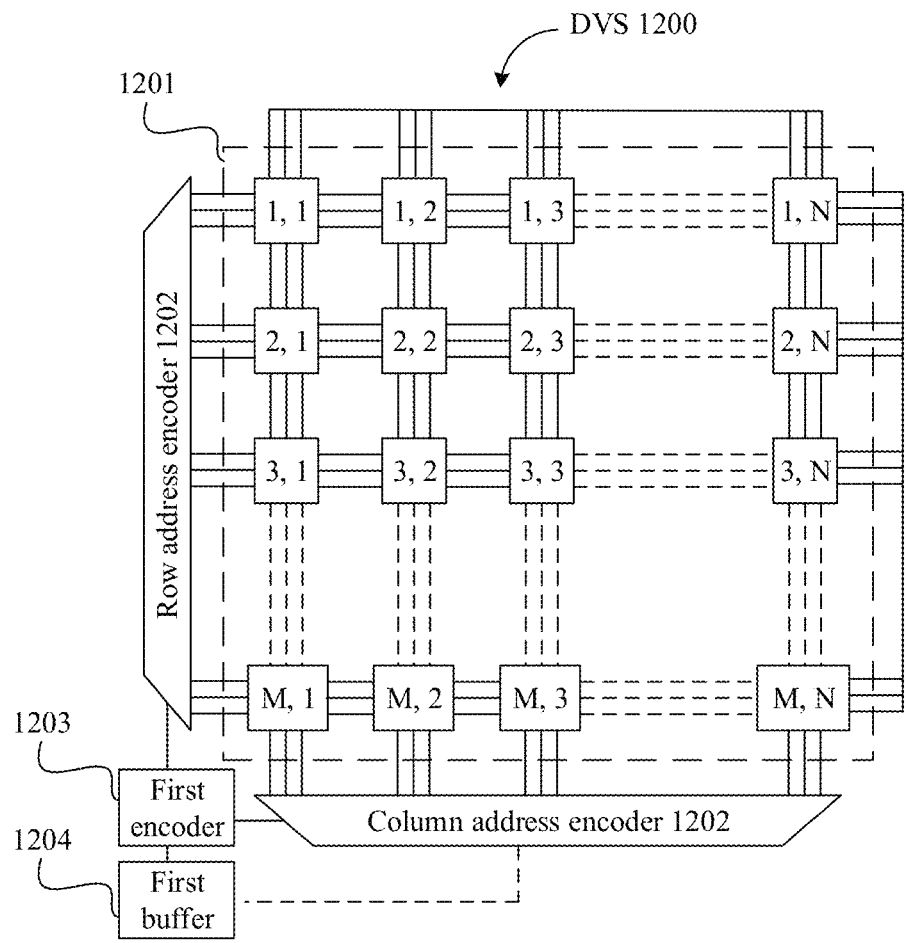
FIG. 12 is a schematic diagram of a structure of a DVS according to an embodiment of this application.

Specifically, FIG. 12 is a schematic diagram of a structure of a DVS according to an embodiment of this application. Referring to FIG. 12, a DVS 1200 includes a dynamic vision sensor array 1201, a row address encoder 1202, a column address encoder 1203, a first encoder 1204, and a first buffer 1205.

The dynamic vision sensor array 1201 includes any one of the plurality of pixel collection circuits described in the embodiments of this application. The pixel collection circuit can generate a pulse signal based on an optical signal, and output the pulse signal to the peripheral circuit. For a specific generation manner, refer to related descriptions in FIG. 2 to FIG. 11. Details are not described herein again. The pixel collection circuit in the sensor array 1201 sends the pulse signal to each of the row address encoder 1202 and the column address encoder 1203. In this way, after receiving the pulse signal sent by the pixel collection circuit, the row address encoder 1202 may send a row coordinate of the pixel collection circuit that generates the pulse signal to the first encoder 1204 together with the pulse signal. After receiving the pulse signal sent by the pixel collection circuit, the column address encoder 1203 may send a column coordinate of the pixel collection circuit that generates the pulse signal to the first encoder 1204 together with the pulse signal. Then, the first encoder 1204 generates an address event representation based on the received pulse signal and coordinates, and encodes the address event representation to generate binary code information.

The first buffer 450 is configured to store the address event representation encoded by the encoder, to be invoked by an external device. The first buffer 450 is further configured to store information output by the column address encoder 430. In one embodiment, the first buffer 450 may be further configured to store information output by the row address encoder 420. This is not limited herein.

Figure 13:
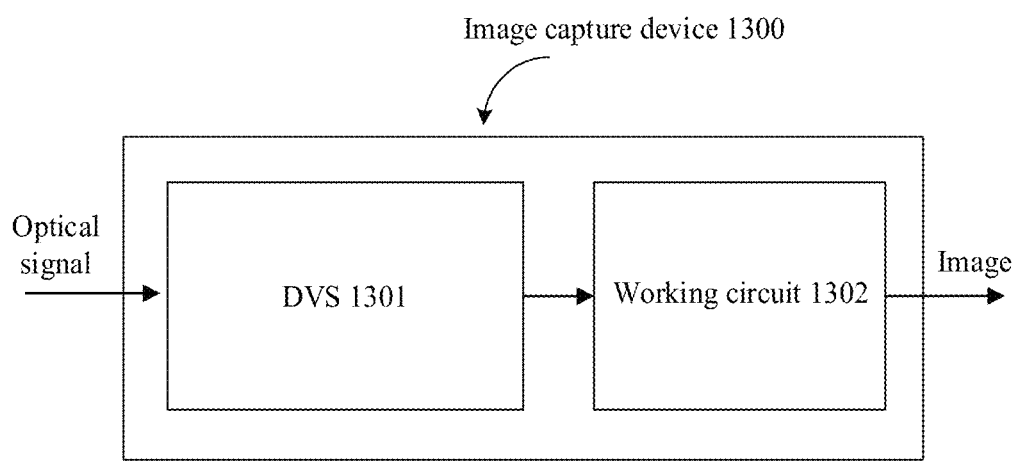
FIG. 13 is a schematic diagram of a structure of an image capture device according to an embodiment of this application.

Based on an inventive concept same as that of the foregoing method, an embodiment of this application provides an image capture device. The image capture device may be an event based high-speed camera described in the foregoing embodiments, for example, a high-speed camera in a device such as a mobile phone, a surveillance camera, or an event data recorder. The device may be configured in scenarios such as assisted driving, automated driving, smart home, and safe city. FIG. 13 is a schematic diagram of a structure of an image capture device according to an embodiment of this application. Referring to FIG. 13, an image capture device 1300 may include: any DVS 1301 described in the embodiments of this application, configured to generate an address event representation based on an optical signal; and a working circuit 1302, configured to generate an image based on the address event representation.

A person skilled in the art can understand that a technology of this application may be implemented in various apparatuses or devices, including a wireless handheld machine, an integrated circuit (IC), or a group of ICs (for example, a chipset). Various components, modules, or units are described in this application to emphasize functional aspects of the apparatuses configured to perform the disclosed technologies, but are not necessarily implemented by using different hardware units. Actually, as described above, various units may be combined into a codec hardware unit in combination with appropriate at least one of software or firmware, or may be provided by interoperable hardware units (including one or more processors described above).

In the foregoing embodiments, descriptions of the embodiments have respective focuses. For a part that is not described in detail in an embodiment, refer to related descriptions in other embodiments.

The foregoing descriptions are merely specific example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A pixel collection circuit, comprising:
an optical-to-electrical converter circuit configured to convert a collected optical signal into an analog signal, and output the analog signal to an analog-to-digital converter circuit;
the analog-to-digital converter circuit configured to receive the analog signal from the optical-to-electrical converter circuit and perform analog-to-digital conversion on the analog signal to obtain a digital signal, and output the digital signal to a differential circuit;
the differential circuit configured to receive the digital signal from the analog-to-digital converter circuit, obtain a difference signal between a digital signal of a previous triggering moment and the digital signal of a current triggering moment, and output the difference signal to a comparison circuit, wherein the previous triggering moment and the current triggering moment are determined by at least a digital clock signal; and
the comparison circuit configured to receive the difference signal from the differential circuit, and compare the difference signal with one or more preset thresholds to output a pulse signal, wherein the pulse signal is used to indicate whether an event occurs.

2. The pixel collection circuit according to claim 1, wherein the differential circuit comprises
a storage circuit configured to: buffer, at a triggering moment, the digital signal output by the analog-to-digital converter circuit, and output, to a subtraction circuit, the digital signal buffered at the current triggering moment; and output, to the subtraction circuit at a non-triggering moment, the digital signal buffered at the previous triggering moment; and
the subtraction circuit configured to calculate the difference signal based on the digital signal of the previous triggering moment that is output by the storage circuit and the digital signal of the current triggering moment that is output by the analog-to-digital converter circuit, and output the difference signal to the comparison circuit, wherein an input end of the storage circuit is electrically connected to an output end of the analog-to-digital converter circuit, an output end of the storage circuit is electrically connected to a first input end of the subtraction circuit, a second input end of the subtraction circuit is electrically connected to the output end of the analog-to-digital converter circuit, and an output end of the subtraction circuit is electrically connected to an input end of the comparison circuit; and wherein the storage circuit and the subtraction circuit have different triggering moments.

3. The pixel collection circuit according to claim 2, wherein the storage circuit is one of a memory, a latch, a trigger, or a register.

4. The pixel collection circuit according to claim 2, wherein the pixel collection circuit further comprises a reset circuit configured to generate a reset signal based on the pulse signal, and output the reset signal to the storage circuit.

5. The pixel collection circuit according to claim 4, wherein an input end of the reset circuit is electrically connected to an output end of the comparison circuit, and an output end of the reset circuit is electrically connected to a reset signal input end of the storage circuit; and
wherein the reset circuit is configured to generate the reset signal in response to the pulse signal indicates that the event occurs.

6. The pixel collection circuit according to claim 1, wherein the one or more preset thresholds comprises a first threshold and a second threshold, and the first threshold is greater than the second threshold; and
the comparison circuit is configured to: in response to the difference signal is greater than or equal to the first threshold, output the pulse signal of which a level is a first value; or in response to the difference signal is less than or equal to the second threshold, output the pulse signal of which a level is a second value; or in response to the difference signal is less than the first threshold and greater than the second threshold, output the pulse signal of which a level is a third value; or in response to the comparison circuit is not triggered, output the pulse signal of which a level is a fourth value, wherein
in response to the level of the pulse signal is the first value or the second value, the pulse signal indicates that the event occurs; or in response to the level of the pulse signal is the third value or the fourth value, the pulse signal indicates that the event does not occur.

7. The pixel collection circuit according to claim 2, wherein the subtraction circuit comprises an absolute value subtractor configured to calculate an absolute value of the difference signal based on the digital signal of the previous triggering moment output by the storage circuit and the digital signal of the current triggering moment output by the analog-to-digital converter circuit, and output the absolute value of the difference signal to the comparison circuit; and
wherein the comparison circuit is configured to: in response to the absolute value of the difference signal is greater than the preset threshold, output the pulse signal of which a level is a fifth value; or in response to the absolute value of the difference signal is less than or equal to the preset threshold, output the pulse signal of which a level is a sixth value, wherein
when the pulse signal is the fifth value, it indicates that the event occurs; or when the pulse signal is the sixth value, it indicates that the event does not occur.

8. The pixel collection circuit according to claim 1, wherein the pixel collection circuit further comprises an accumulation circuit configured to accumulate, at a non-triggering moment, the analog signal output from the optical-to-electrical converter circuit, and output an accumulated analog signal to the analog-to-digital converter circuit at a triggering moment; or configured to accumulate, at the non-triggering moment, the digital signal output from the analog-to-digital converter circuit, and output the accumulated digital signal to the differential circuit at a triggering moment.

9. The pixel collection circuit according to claim 8, wherein the pixel collection circuit further comprises a switch circuit configured to receive the digital signal output by the analog-to-digital converter circuit and the pulse signal output by the comparison circuit; or in response to the pulse signal indicates that the event occurs, output the digital signal of the current triggering moment, wherein a first input end of the switch circuit is electrically connected to the output end of the analog-to-digital converter circuit, and a second input end of the switch circuit is electrically connected to the output end of the comparison circuit.

10. The pixel collection circuit according to claim 9, wherein the first input end of the switch circuit is electrically connected to an output end of the optical-to-electrical converter circuit, or the first input end of the switch circuit is electrically connected to an output end of the accumulation circuit; and the second input end of the switch circuit is electrically connected to the output end of the comparison circuit; and wherein the switch circuit is further configured to receive the analog signal output by the optical-to-electrical converter circuit and the pulse signal output by the comparison circuit; or in response to the pulse signal indicates that the event occurs, output the analog signal; or the switch circuit is further configured to receive the accumulated analog signal output by the accumulation circuit and the pulse signal output by the comparison circuit; or in response to the pulse signal indicates that the event occurs, output the digitally accumulated analog signal.

11. The pixel collection circuit according to claim 9, wherein the switch circuit is further configured to: in response to the pulse signal indicates that the event does not occur, keep outputting the digital signal of the previous triggering moment; or in response to the pulse signal indicates that the event does not occur, output no signal; or in response to the pulse signal indicates that the event does not occur, output a low-level signal.

12. The pixel collection circuit according to claim 8, wherein the accumulation circuit comprises an analog buffer or a digital buffer, wherein an input end of the analog buffer is electrically connected to the output end of the optical-to-electrical converter circuit, and an output end of the analog buffer is electrically connected to an input end of the analog-to-digital converter circuit; and an input end of the digital buffer is electrically connected to the output end of the analog-to-digital converter circuit, and an output end of the digital buffer is electrically connected to an input end of the differential circuit.

13. The pixel collection circuit according to claim 1, wherein the event is that a light intensity in a field of view changes.

14. The pixel collection circuit according to claim 4, wherein the reset signal is used to control a status of the storage circuit with the digital clock signal.

15. A dynamic vision sensor, comprising a dynamic vision sensor array comprising a plurality of pixel collection circuits, each pixel collection circuit of the plurality of pixel collection circuits comprising an optical-to-electrical converter circuit configured to convert a collected optical signal into an analog signal, and output the analog signal to an analog-to-digital converter circuit;

the analog-to-digital converter circuit configured to receive the analog signal from the optical-to-electrical converter circuit and perform analog-to-digital conversion on the analog signal to obtain a digital signal, and output the digital signal to a differential circuit;

the differential circuit configured to receive the digital signal from the analog-to-digital converter circuit, obtain a difference signal between a digital signal of a previous triggering moment and the digital signal of a current triggering moment, and output the difference signal to a comparison circuit, wherein the previous triggering moment and the current triggering moment are determined by at least a digital clock signal; and the comparison circuit configured to receive the difference signal from the differential circuit, and compare the difference signal with one or more preset thresholds to output a pulse signal, wherein the pulse signal is used to indicate whether an event occurs;

wherein each pixel collection circuit is configured to generate the pulse signal based on the collected optical signal, and output the pulse signal to a peripheral circuit; and the peripheral circuit configured to generate an address event representation based on the pulse signal.

16. An image capture device, comprising:

a dynamic vision sensor comprising a dynamic vision sensor array comprising a plurality of pixel collection circuits, each pixel collection circuit of the plurality of pixel collection circuits comprising an optical-to-electrical converter circuit configured to convert a collected optical signal into an analog signal, and output the analog signal to an analog-to-digital converter circuit;

the analog-to-digital converter circuit configured to receive the analog signal from the optical-to-electrical converter circuit and perform analog-to-digital conversion on the analog signal to obtain a digital signal, and output the digital signal to a differential circuit;

the differential circuit configured to receive the digital signal from the analog-to-digital converter circuit, obtain a difference signal between a digital signal of a previous triggering moment and the digital signal of a current triggering moment, and output the difference signal to a comparison circuit, wherein the previous triggering moment and the current triggering moment are determined by at least a digital clock signal; and the comparison circuit configured to receive the difference signal from the differential circuit, and compare the difference signal with one or more preset thresholds to output a pulse signal, wherein the pulse signal is used to indicate whether an event occurs;

wherein each pixel collection circuit is configured to generate the pulse signal based on the collected optical signal, and output the pulse signal to a peripheral circuit; and the peripheral circuit configured to generate an address event representation based on the pulse signal, wherein the dynamic vision sensor is configured to generate the address event representation based on the optical signal; and a working circuit, configured to generate an image based on the address event representation.

* * * * *